G. J. MEYER.
BOTTLER'S APPARATUS.
APPLICATION FILED JUNE 25, 1906.
940,178.
Patented Nov. 16, 1909.
6 SHEETS—SHEET 1.
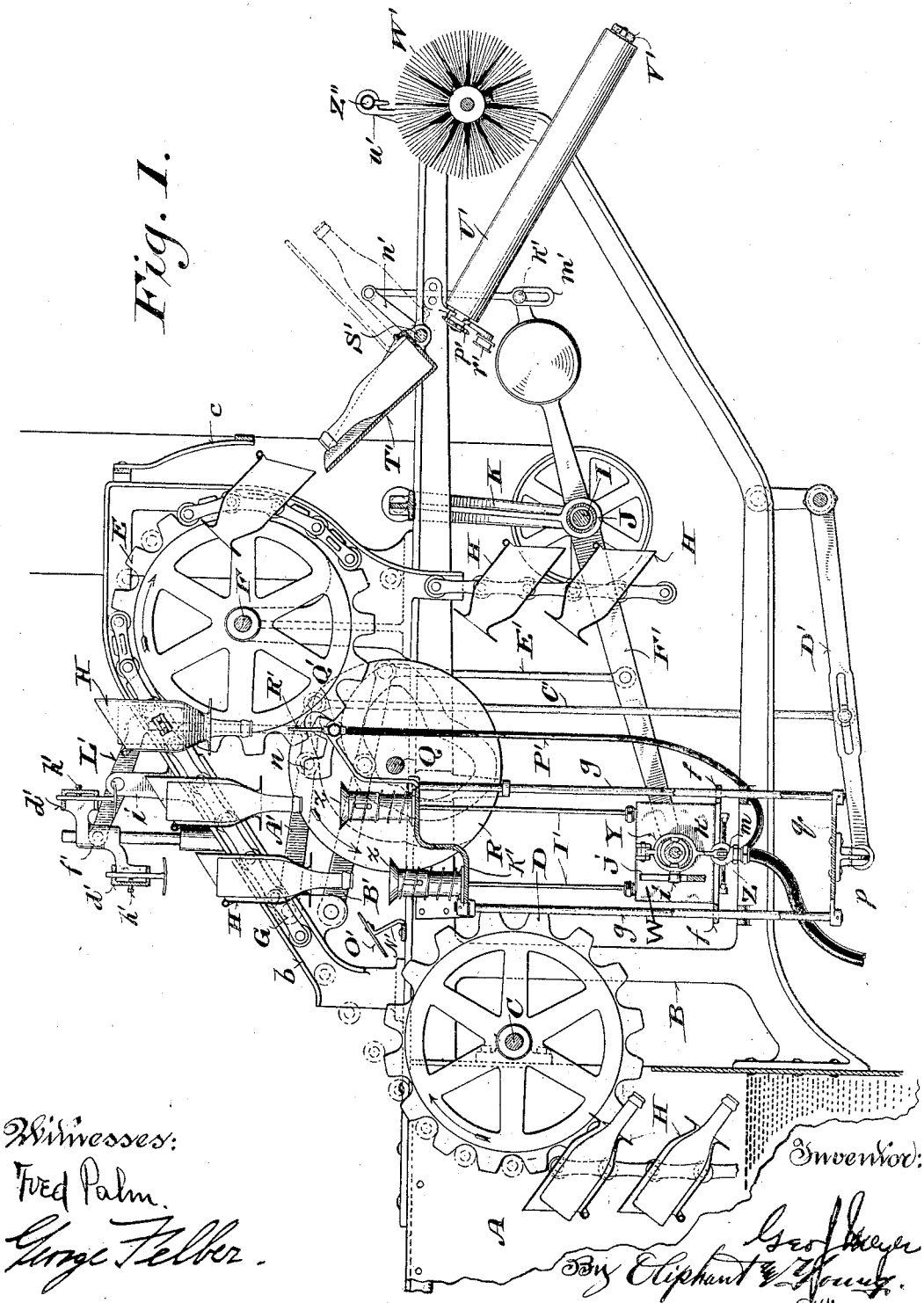

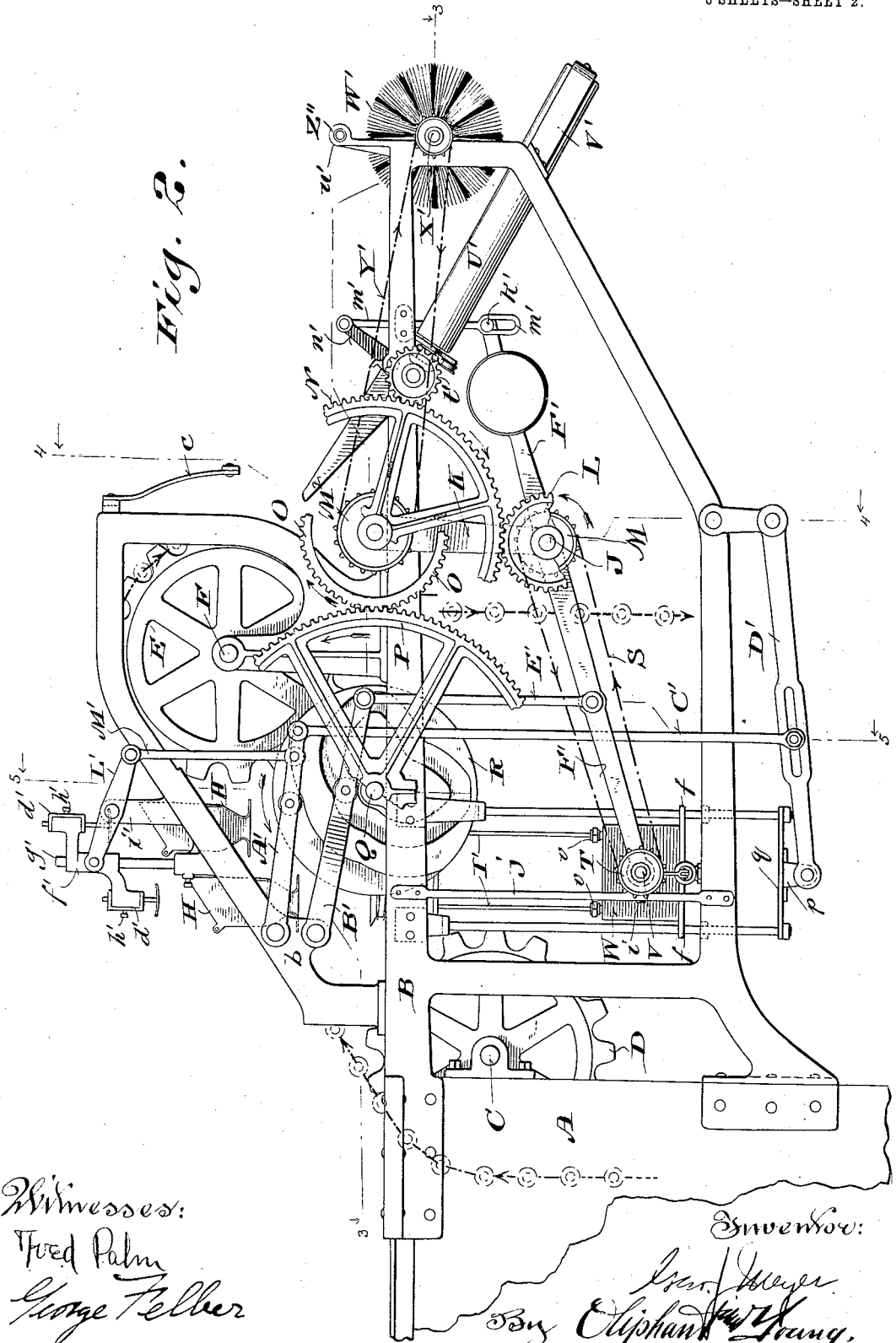

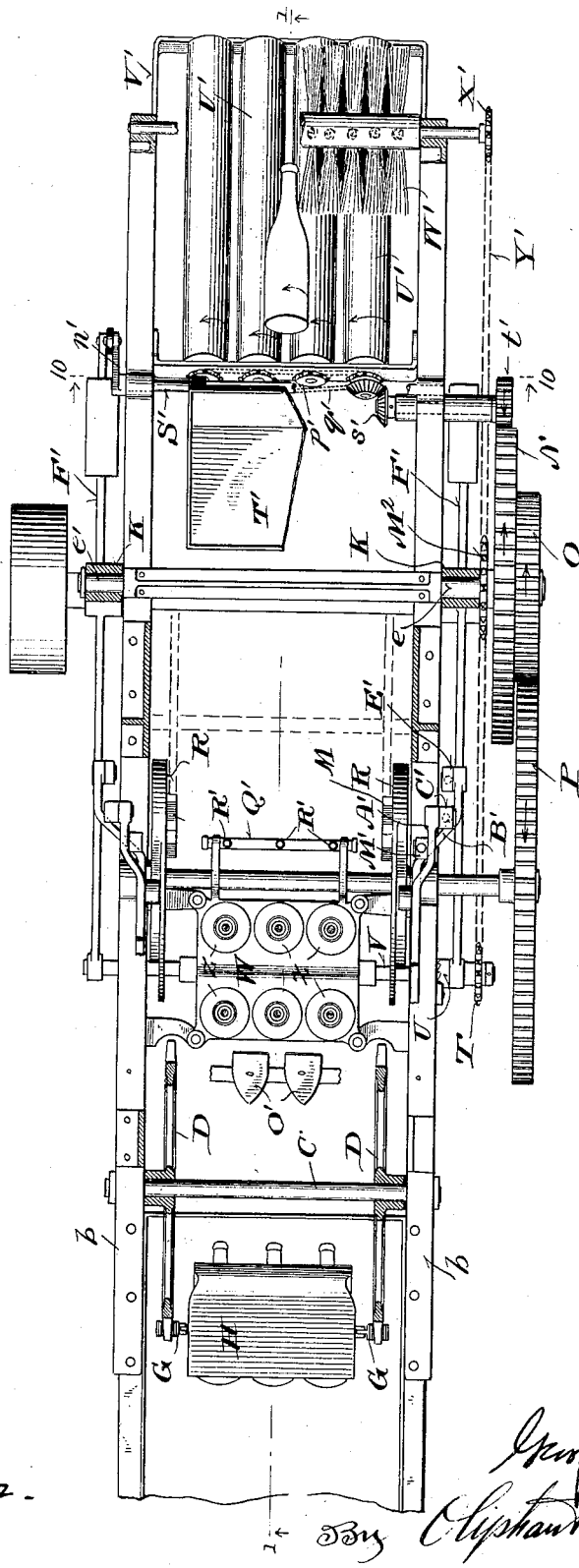

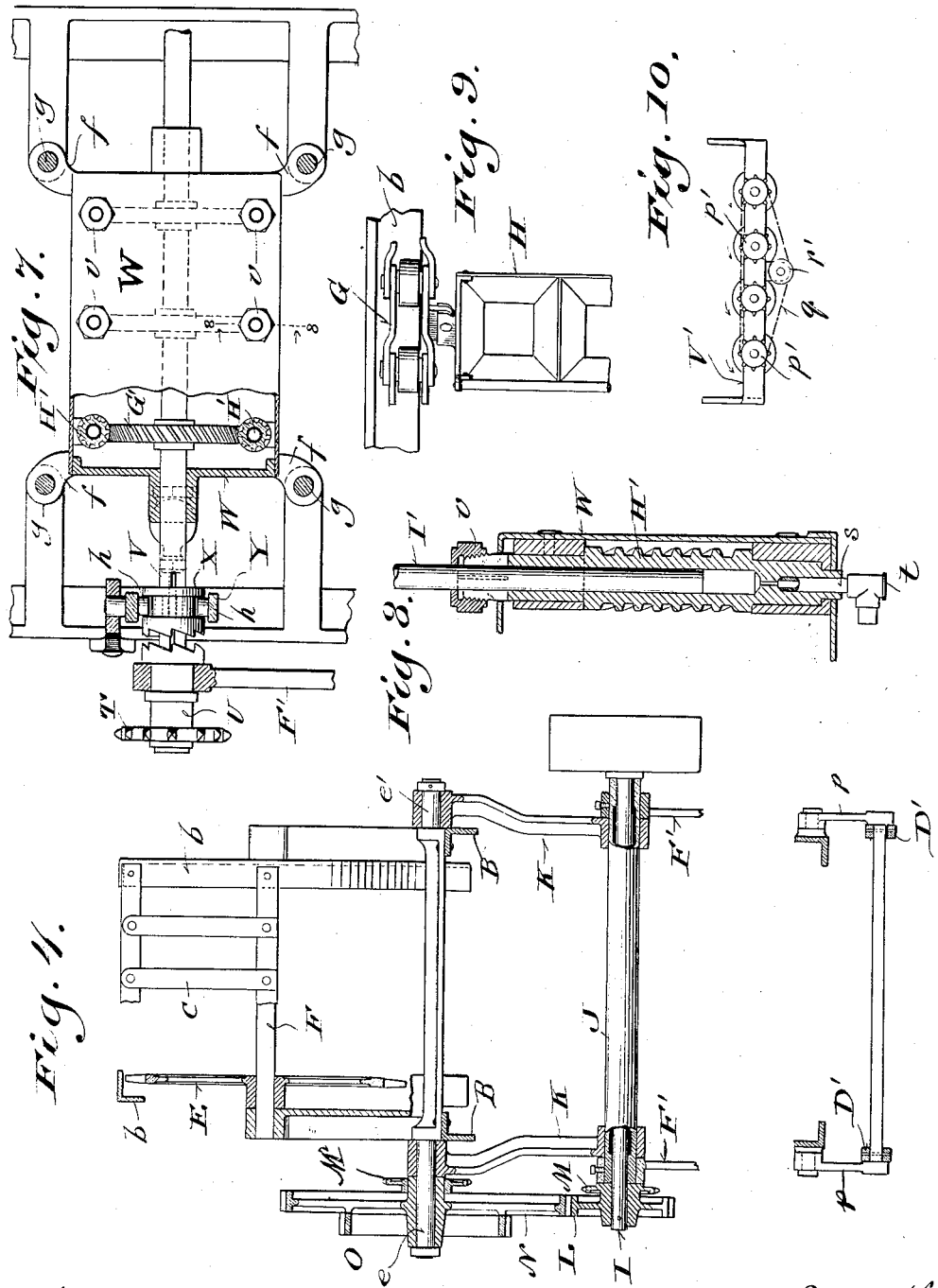

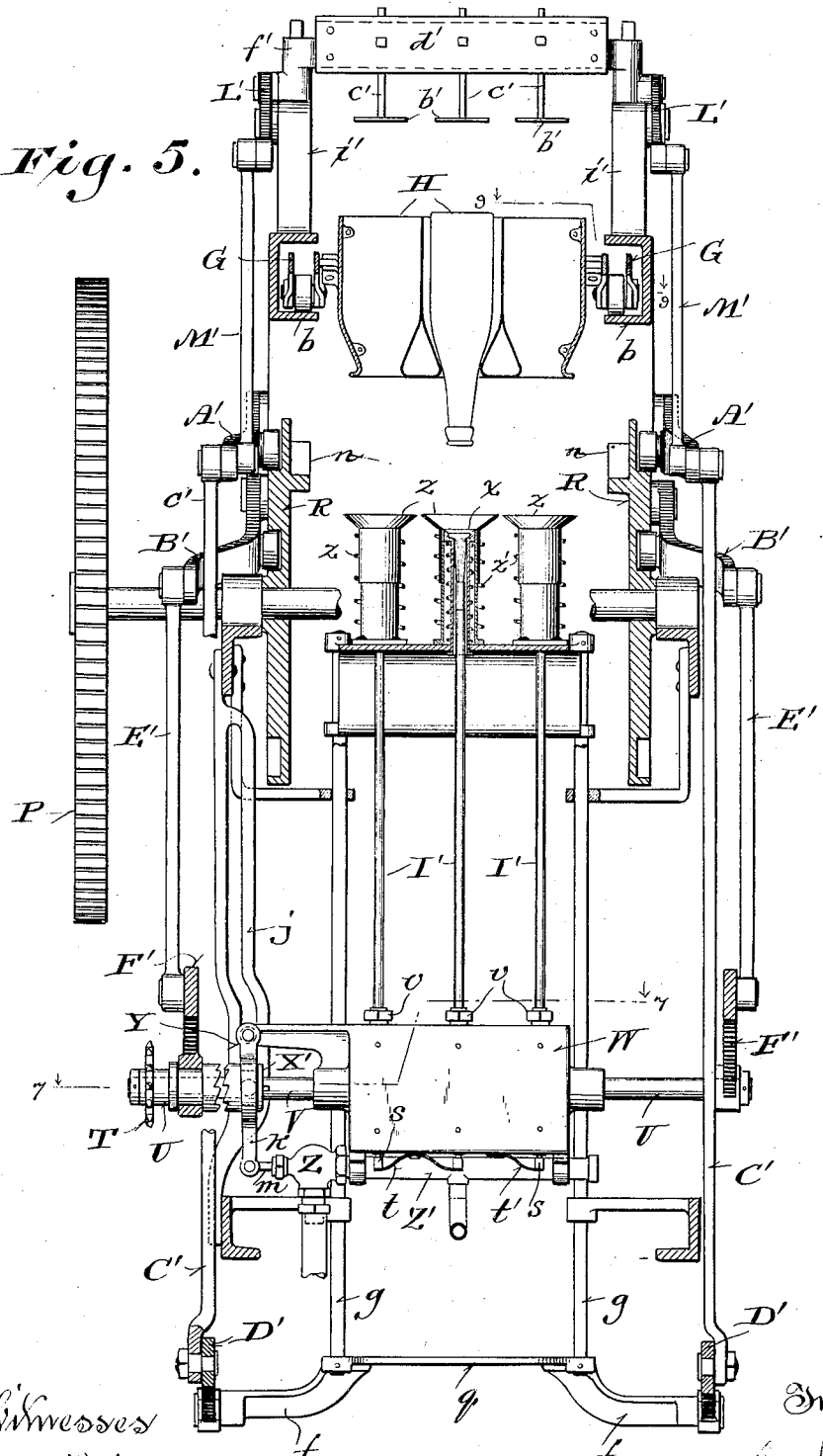

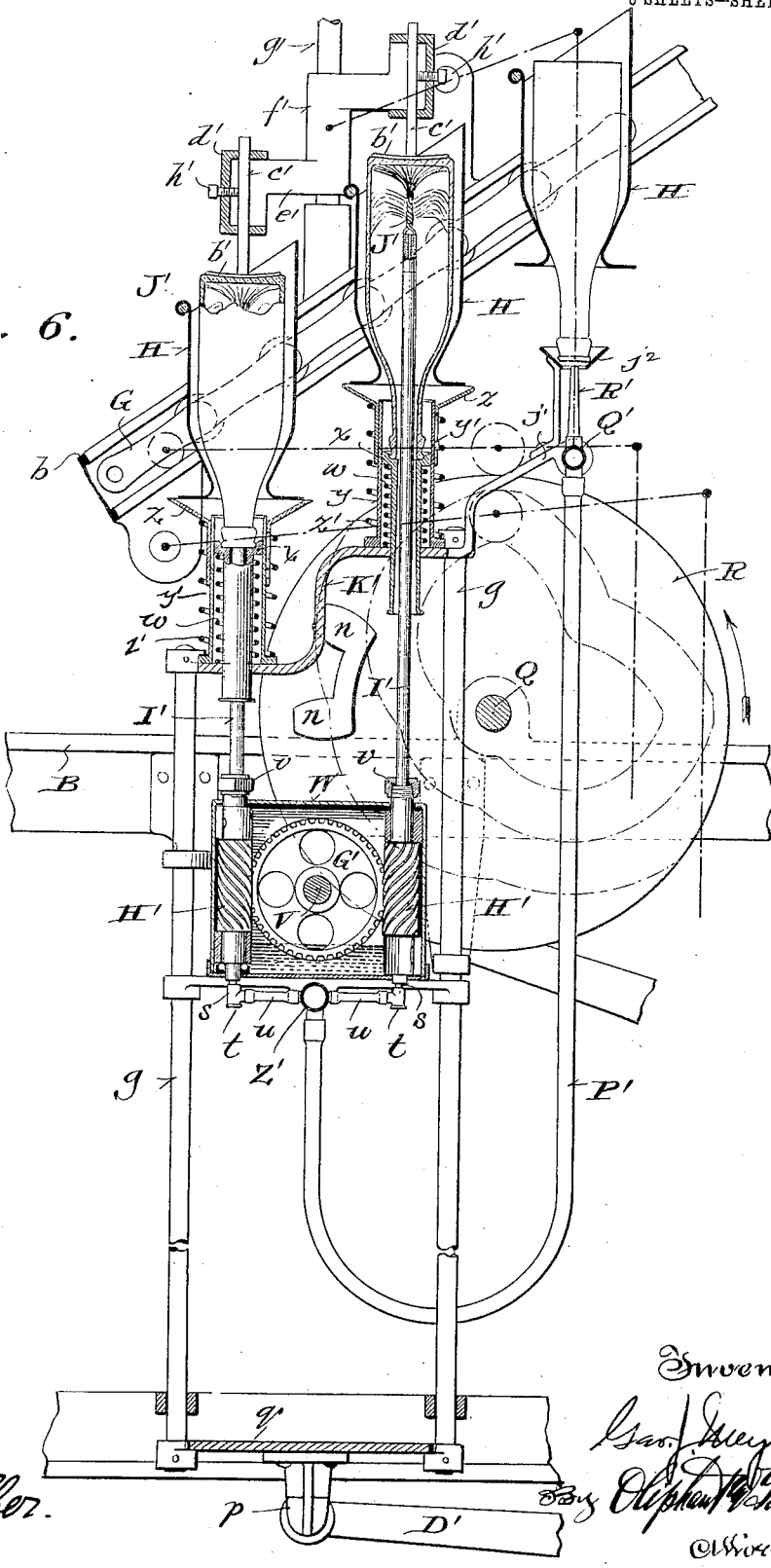

UNITED STATES PATENT OFFICE.

GEORGE J. MEYER, OF MILWAUKEE, WISCONSIN.

BOTTLER'S APPARATUS.

940,178. Specification of Letters Patent. Patented Nov. 16, 1909.

Application filed June 25, 1906. Serial No. 323,193.

*To all whom it may concern:*

Be it known that I, GEORGE J. MEYER, a citizen of the United States, and resident of Milwaukee, in the county of Milwaukee and State of Wisconsin, have invented certain new and useful Improvements in Bottlers' Apparatus; and I do hereby declare that the following is a full, clear, and exact description thereof.

My invention consists in what is herein shown, described and claimed, its object being to provide a simple, economical and effective apparatus in conjunction with a soak-tank for the successive, inner washing and rinsing of bottles, said apparatus being also shown organized to employ a bottle-scrubbing mechanism.

Figure 1 of the accompanying drawings represents a vertical longitudinal section view indicated by line 1—1 in Fig. 3 and illustrates a fragment of a soak-tank and apparatus in connection therewith for the inner washing and rinsing of the bottles, the organization of said apparatus being such as to provide for an outer scrubbing of the bottles subsequent to a delivery of the same from the racks of a conveyer; Fig. 2, a side elevation of the fragment of soak-tank and said apparatus therewith having parts of the same broken away; Fig. 3, a plan view of the same partly in horizontal section as indicated by lines 3—3 in Fig. 2; Figs. 4 and 5, transverse section views of the apparatus respectively indicated by lines 4—4 and 5—5 in Fig. 2; Fig. 6, a sectional view of a fragment of said apparatus on an enlarged scale illustrating the inner washing and rinsing of bottles; Fig. 7, a horizontal section view indicated by lines 7—7 in Fig. 5; Fig. 8, a section view of a fragment of the apparatus indicated by line 8—8 in Fig. 7; Fig. 9, a partly sectional view of another fragment of the apparatus indicated by lines 9—9 in Fig. 5, and Fig. 10, an elevation of a fragment of the bottle scrubbing adjunct of said apparatus.

Referring by letter to the drawings, A indicates a soak-tank to which a frame B of any suitable construction is suitably connected or otherwise adjunctive. The frame is provided with bearings for a shaft C to which sprocket-wheels D are made fast and projected through end notches of the tank. Trained on these wheels and similar wheels E, fast on another shaft F, are link-belts G having link-arms thereof at intervals in rigid connection with racks H to constitute a bottle-conveyer. The shaft F has its bearings in the frame aforesaid and this frame is provided with guide-ways $b$ for the link-belts of the conveyer. A fender $c$ is shown in connection with the frame.

The drive-shaft I of the apparatus has its bearings in a sleeve J that is loose in oscillative hangers K suspended on frame studs $e, e'$ as best shown in Fig. 4. A combined spur-pinion L and sprocket-wheel M are fast on one end of the drive-shaft, the pinion being in mesh with a spur-wheel N loose on the stud $e$ and combined with a spur-pinion O that meshes with another spur-wheel P fast on a shaft Q for which the aforesaid frame is provided with bearings, a pair of cam-wheels R being also fast on the latter shaft within said frame. The sprocket-wheel M is connected, by a link-belt S, with a similar wheel T that is fast with a clutch-sleeve U on a shaft V for which a vertically reciprocative gear-box W is provided with bearings, corner-arms $f$ of this gear-box being guided on rods $g$ that of themselves are vertically reciprocative in guides with which the frame of the apparatus is provided. Splined on the shaft V is another clutch-sleeve X having an annular outer groove thereof engaged by inner lugs $h$ of a spanner Y pivotally suspended in connection with the gear-box and provided with an outer lug $i$ engaging a vertical cam-guide $j$ that is fastened at its ends in connection with a side of the frame aforesaid. The spanner is also provided with a depending lever $k$ coupled to the valve-stem $m$ of a water-way cock Z having the connection hereinafter specified.

The cam-wheels R are provided with lateral teeth $n$ that mesh with the sprocket-wheels E once in each revolution of the shaft Q to impart intermittent travel to the bottle-conveyer, and said cam-wheels engage with, (preferably anti-friction) projections of levers A', B', fulcrumed in connection with the frame aforesaid. The levers A' are connected, by link-rods C', with levers D' also fulcrumed in connection with said frame and attached to central lateral arms $p$ of a flat-plate $q$ that is fastened to the lower ends of the rods $g$ aforesaid. The levers D' are longitudinally slotted to provide for adjustable connection therewith of the link-rods C' aforesaid, in order to vary the lift of the rods $g$ and parts therewith. The levers B' are connected, by link-rods E' with counter-weighted levers F' one of which levers is connected to the clutch-sleeve U and the other to the shaft V aforesaid, both of the levers F' being made fast on the sleeve J in which the drive-shaft I has its bearings.

Fast on the shaft V, within the gear-box W, are worm-wheels G' in mesh with hollow vertically disposed worm-spindles H' journaled in bearings provided in said box, and to lessen friction due to end thrust of the spindles, ball-bearings are provided. The worm-wheels are run in oil or other lubricant contained in the aforesaid box.

In ground-joint fit in the lower journals of the worm-spindles H' are hollow plugs $s$ held to seat by springs $t$ in connection with the bottom of the gear-box, and hose $u$ connects branches of a water-way Z' with the plugs aforesaid, this water-way being controlled by the cock Z above specified. The upper journals of the worm-spindles are longitudinally kerfed and exteriorly tapered at their ends, these tapered ends being exteriorly screw-threaded for the engagement of clamp-caps $v$ by which a friction-clutch engagement of each spindle is had with a water-conductor tube I' having an upper end water-distributing brush-tip J' of any suitable construction.

Fast on the upper ends of the rods $g$ is a stepped plate K' supporting spiral-springs $w$ that in turn support bottle-neck seats $x$ surrounding the water-pipes I' and having depending shanks loose in apertures with which said plate is provided. The bottle-neck seats are guided in shells $y$ mounted fast on the steps of the plate K', and guided on studs $y'$ of the shells are vertically slotted shanks of cups $z$ supported by spiral-springs $z'$ surrounding said shells. In line with the bottle-neck seats $x$ are bottle-bottom clamp-plates $b'$ having shanks $c'$ engaging lateral channel extensions $d'$ of arms of a sleeve $f'$ reciprocative on a vertical stem $g'$ in connection with the frame B of the apparatus, set-screws $h'$ being employed to hold said shanks in vertical adjusted position.

A lever L', in connection with the sleeve $f'$ is fulcrumed on a frame-bracket $i'$ and connected, by a link-rod M' with the cam-controlled lever A' aforesaid.

Arranged on a support N', attached to the frame B, are inclined plates O' in the path of the depending necks of bottles in the racks aforesaid, and by means of said plates, the bottles are centered in said racks on their way to aline with the neck-seats and bottom-clamps aforesaid.

In connection with the water-way Z' aforesaid is one end of a slack hose P' having its other end coupled to a pipe Q' provided with rinsing-nozzles R' and supported in arms $j'$ of the plate K' aforesaid, bottle-neck rest $j''$ being also supported in connection with said arms.

As herein shown one of the counterweighted levers F' has an end-lug $k'$ engaging a slot in a link-rod $m'$ coupled to a crank-arm $n'$ of a rock-shaft S' to which a bottle-tray T' is secured, the frame B being provided with bearings for the rock-shaft. The tray is arranged to receive bottles discharged from the racks of the conveyer, and the rock-shaft is timed to tilt said tray, as shown by dotted lines in Fig. 1, to deliver the bottles into the interstices between inclined rollers U' journaled in a frame V' auxiliary to the frame B aforesaid to which it is attached. Fast on journals of the rollers U' are sprocket-wheels $p'$ engaging a link-belt $q'$ that is kept sufficiently taut by a suitably disposed idler-wheel $r'$, and one of said rollers has a journal thereof in bevel-gear connection with a spindle $s'$ provided with a spur-pinion $t'$ that meshes with the spur-wheel N, whereby a rolling motion is given to the bottles while on gravity descent along the aforesaid rollers.

Journaled in the main-frame B is a cylindrical brush W' over the rollers U', crosswise of same and a sprocket-wheel X' fast on one of the brush-journals is connected by a link-belt Y' with the sprocket-wheel M'' aforesaid, whereby rotary motion is imparted to said brush. A spray-pipe Z'' is supported by main-frame brackets $u'$ over the brush W' and said brush operates to scrub the exterior of the bottles passing between it and the underlying rollers. However said bottle-dumping, rolling and scrubbing mechanism may be disconnected or entirely dispensed with in the organization of the apparatus.

In the operation of the apparatus, intermittent travel of the bottle-conveyer is had, by means of the action of the teeth $n$ of the cam-wheels R in conjunction with the sprocket-wheels E, and the time of said cam-wheels, with respect to the lever A', is such that subsequent to the predetermined movement of said conveyer, the stepped plate K' and parts in connection therewith are lifted from the position shown in Fig. 1, while at the same time the sleeve $f'$ and parts therewith are lowered from the position also shown in Fig. 1, the result being a centering and clamping of the bottles elevated from the soak-tank and for a time at rest vertically and mouth down in racks of the conveyer, as shown in Fig. 6. The bottles remain clamped for a time, and the action of the cam-wheels, with respect to the levers B', is such that there is lift of the gear-box W from the position shown in Fig. 1, to that shown in Fig. 6, an engagement of the clutch-sleeves X, U, and an opening of the water-way cock Z, whereby the rotating water-conductor tubes I' and their brush-tips J' are run up in said bottles to wash the same, the time of the cam-wheels aforesaid being such that said water-tubes and brush-tips are reciprocated in the aforesaid bottles, prior to the return of said gear-box and parts in connection therewith to the first position. The organization of the apparatus herein shown is such that there are two washings of each bottle by as many water-distributing brush-tips, and the bottles are subsequently rinsed by being alined over the nozzles R' of the pipe Q' in slack hose connection with the water-way aforesaid, after which they may be discharged into the tilt-tray T', to be delivered parallel to the inclined rollers U', in the interstices between pairs of same, under the rotary scrubbing-brush W', aforesaid.

I claim:

1. The combination of a soak-tank, a bottle-conveyer having intermittent travel through the tank, vertically reciprocative bottle-neck seats and bottle-bottom clamp-plates, a vertically reciprocative gear-box, hollow spindles having their drive in the box, water-pipes in connection with the spindles to rotate therewith and extend through the bottle-neck seats, water-distributing brush-tips in connection with the pipes, a water-way having connections discharging into said spindles, and means controlling start and stop of the spindle-drive as well as concurrent opening and closing of the water-way, the motion of said conveyer being arrested during the time the bottle-cleaning mechanism is in operation.

2. The combination of a soak-tank, a bottle-conveyer having intermittent travel through the tank, vertically reciprocative bottle-neck seats and bottle-bottom clamp-plates, a vertically reciprocative gear-box, hollow spindles having their drive in the box, water-pipes in connection with the spindles to rotate therewith and extend through the bottle-neck seats, water-distributing brush-tips in connection with the pipes, a water-way having connections discharging into said spindles, a pipe provided with bottle-rinsing nozzles and suitably connected to the water-way, and means controlling start and stop of the spindle-drive as well as concurrent opening and closing of the water-way, the motion of said conveyer being arrested during the time bottle-cleaning and rinsing operations take place.

3. The combination of a soak-tank, a bottle-conveyer having intermittent travel through the tank, a reciprocative carrier, bottle-neck seats having yielding support in conjunction with the support, guide-shells inclosing said seats, cups having shanks in yielding connection with the shells, a gear-box in independent reciprocative connection with said carrier, water-pipes in connection with driven-spindles in the gear-box, and extended through the aforesaid seats, water-distributing brush-tips in connection with the pipes, reciprocative bottle-bottom clamp-plates alined with said pipes, the washing mechanism being engageable with bottles suspended mouth down in racks of the conveyer when the latter is at rest, and means for automatic supply and cut-off of water with respect to the aforesaid pipes.

4. The combination of a soak-tank, an endless link-belt type bottle-conveyer having travel through the tank, inclined rollers along which the bottles delivered from the conveyer have parallel gravity descent in interstices between pairs of same, a cylindrical brush journaled in bearings over the rollers crosswise of same, means for actuating said rollers and brush, and means for supplying water to the brush.

5. The combination of a soak-tank, a bottle-conveyer having travel through the tank, a tilt-tray arranged to receive the bottles discharged from the conveyer, means for intermittently actuating the tray, inclined rollers along which bottles dumped from the tray have gravity descent, a cylindrical brush journaled in bearings over the rollers, means for actuating said rollers and brush, and means for supplying water to the brush.

6. The combination of a soak-tank, an endless link-belt type bottle-conveyer having intermittent travel through the tank and outside the same, means for inner washing and rinsing of inverted bottles when at rest with their conveyer from time to time outside the tank, and means for outer cleaning of the inner washed and rinsed bottles intermittently discharged from the aforesaid conveyer.

In testimony that I claim the foregoing I have hereunto set my hand at Milwaukee in the county of Milwaukee and State of Wisconsin in the presence of two witnesses.

GEORGE J. MEYER.

Witnesses:
  N. E. OLIPHANT,
  GEORGE FELBER.